US011860575B2

(12) United States Patent
Renaud

(10) Patent No.: US 11,860,575 B2
(45) Date of Patent: Jan. 2, 2024

(54) FREE DIRECT ESCAPEMENT MECHANISM FOR A TIMEPIECE

(71) Applicant: François Besse, Nyon (CH)

(72) Inventor: Dominique Renaud, Morges (CH)

(73) Assignee: François Besse, Nyon (CH)

( * ) Notice: Subject to any disclaimer, the term of this patent is extended or adjusted under 35 U.S.C. 154(b) by 595 days.

(21) Appl. No.: 17/048,325

(22) PCT Filed: Apr. 17, 2019

(86) PCT No.: PCT/EP2019/059890
§ 371 (c)(1),
(2) Date: Nov. 4, 2020

(87) PCT Pub. No.: WO2019/201977
PCT Pub. Date: Oct. 24, 2019

(65) Prior Publication Data

US 2021/0173342 A1 Jun. 10, 2021

(30) Foreign Application Priority Data

Apr. 17, 2018 (EP) .................................... 18167638
May 16, 2018 (EP) .................................... 18172526
Sep. 18, 2018 (EP) .................................... 18195289

(51) Int. Cl.
*G04B 15/08* (2006.01)
*G04B 15/14* (2006.01)
*G04B 5/08* (2006.01)

(52) U.S. Cl.
CPC ............... *G04B 5/08* (2013.01); *G04B 15/14* (2013.01)

(58) Field of Classification Search
CPC ................................ G04B 15/08; G04B 15/14
See application file for complete search history.

(56) References Cited

U.S. PATENT DOCUMENTS 258,646 A * 5/1882 Heberle ................. G04B 15/02 968/96
2018/0231936 A1* 8/2018 Fukuda .................. G04B 15/14

FOREIGN PATENT DOCUMENTS

CH 703338 A2 * 12/2011 ........... G04B 13/021
CH 709946 A2 * 1/2016 ............. G04B 15/08
(Continued)

OTHER PUBLICATIONS

International Search Report for PCT/EP2019/059890 dated Jul. 24, 2019, 6 pages.
(Continued)

*Primary Examiner* — Edwin A. Leon
*Assistant Examiner* — Kevin Andrew Johnston
(74) *Attorney, Agent, or Firm* — NIXON & VANDERHYE

(57) ABSTRACT

A direct impulse free escapement mechanism for a timepiece includes: an escapement wheel with peripheral teeth; a locking device including a locking pallet engaging an escapement wheel tooth in a locking position of the locking device; and a control pallet actuated by a pivoting regulating organ to engage a complementary unlocking organ of the locking device to release the locking device from the escapement wheel in an unlocking position at each alternation of the regulating organ. Also included are impulse pallets attachable to the regulating organ, cooperating on an impulse plane with a tooth of the escapement wheel to transmit a direct impulse to the regulating organ. The locking device is drawn by the escapement wheel in each locking position. The teeth of the escapement wheel and the impulse pallets are configured so the impulses occur outside the plane of the escapement wheel. A corresponding timepiece is also disclosed.

20 Claims, 7 Drawing Sheets

(56) References Cited

FOREIGN PATENT DOCUMENTS

| | | | |
|---|---|---|---|
| EP | 1 122 617 | | 8/2001 |
| EP | 1 983 390 | | 10/2008 |
| EP | 2 407 830 | | 1/2012 |
| EP | 2 444 860 | | 4/2012 |
| EP | 3 070 537 | | 9/2016 |
| FR | 1 009 853 | | 6/1952 |
| JP | 2018-048958 | A | 3/2018 |
| WO | 2016/012281 | | 1/2016 |

OTHER PUBLICATIONS

Written Opinion of the ISA for PCT/EP2019/059890 dated Jul. 24, 2019, 5 pages.

* cited by examiner

FREE DIRECT ESCAPEMENT MECHANISM FOR A TIMEPIECE

TECHNICAL FIELD

The present invention relates to the field of watchmaking. It concerns, more specifically, a free direct escapement mechanism.

The invention also relates to a timepiece incorporating such an escapement mechanism.

STATE OF THE ART

Anchor escapements are certainly the most common type of escapement in mechanical watch mechanisms, at least in the so-called free escapement class. Associated with a regulating organ, typically of the pendulum or sprung balance assembly type, an anchor escapement makes it possible to maintain the oscillations of said regulating organ by transmitting to it by regular impulses, at a determined frequency, a fraction of the mechanical energy of the mechanical energy source of a said watch mechanism, usually comprising at least one barrel spring. At the same time, the escapement also allows the oscillations of the regulating organ to be counted and thus the time to be counted.

Numerous variants of anchor escapements have been proposed in the state of the art and are well known to the man of the art in the field of watchmaking. Their limitations, which are equally well known, are mainly a propensity to disturb the isochronism of the oscillations of the regulating organ due to the successive shocks and friction between the anchor and the regulating organ on the one hand and the anchor and the escapement wheel on the other, as well as a low mechanical efficiency, mainly for the same reasons. Indeed, it is usually considered that an anchor-type escapement only transmits a limited amount, of the order of only 30%, of the driving force it receives from the driving source to the regulating organ.

Anchor escapements, on the other hand, are praised for their reliable operation and are also self-starting.

Robin-type anchor mechanisms have the advantage of better performance than Swiss anchor escapement mechanisms. The Robin escapement is an escapement that combines the advantages of the detent escapement (high efficiency and direct transmission of energy between the escapement wheel and the balance) with those of the anchor escapement (better operating safety). It is a direct impulse free escapement from the escapement wheel to the balance, the anchor of the escapement mechanism essentially constituting a lever equipped with two locking pallets and which tilts between two extreme locking positions of the escapement wheel outside the impulse phases. Their efficiency is highly praised because they allow a substantial gain in energy transmission to the regulating organ compared to a Swiss anchor escapement, the energy transmitted being around 50%.

However, the angle of lift of the Robin anchor is very small (about 5°) compared to the classical Swiss anchors (about 15°), which makes it difficult to apply the usual solution of securing the latter by guard pin and plate. For this purpose, alternative solutions were proposed in documents EP 1 122 617 B1 and EP 2 444 860 A1 or EP 2 407 830 B1. However, these Robin escapement mechanisms and associated safety devices are delicate to implement, so much so that they have never experienced massive commercial and industrial development, which their intrinsic technical performance could justify.

The purpose of the present invention is also to provide a direct and free watch escapement mechanism which is as simple and reliable to operate as a Swiss lever escapement but which benefits from singularly improved chronometric performances, at least similar to those of direct impulse escapements without however presenting their difficulties of operation.

Finally, the invention has the purpose of offering a timepiece comprising such an escapement mechanism.

DISCLOSURE OF THE INVENTION

For this purpose, the present invention provides an anchor escapement mechanism according to claim 1, as well as a timepiece provided with such an escapement and defined in claim 20.

The invention thus proposes, according to a first object, a direct impulse free escapement mechanism for a timepiece, comprising:

- an escapement wheel, extending in a plane P1 and rotatable about a first axis of rotation perpendicular to this plane and provided with a series of peripheral teeth, said teeth defining by their ends during rotation of the escapement wheel a circular trajectory C,
- a locking device comprising at least one locking pallet arranged to cooperate in abutment with a tooth of the escapement wheel in at least one locking position of said locking device,
- at least one control pallet capable of being attached to a regulating organ pivoting about an axis of rotation in order to cooperate with at least one complementary unlocking organ of the locking device in order to unlock the locking device from the escapement wheel in a unlocking position at each alternation of said regulating organ,
- impulse pallets capable of being attached to said regulating organ to cooperate each on an impulse plane with a tooth of the escapement wheel to transmit a direct impulse to said regulating organ.

In accordance with the invention, the escapement mechanism is characterised in that the locking device is arranged to undergo a draw by the escapement wheel in each locking position and that the teeth of the escapement wheel and the impulse pallets are configured and arranged such that the impulses occur outside the plane P1 of the escapement wheel.

The mechanism of the invention thus proposes in an inventive manner to move the impulse place of the escapement wheel on the impulse pallets attached to the regulating organ out of the plane P1 in which the escapement wheel extends and rotates. It is thus possible to reduce the dimensions of the portion of the teeth of the escapement wheel which is active to provide an effective impulse on the impulse plane of the impulse pallets, while allowing out of impulse, thanks to the associated draw, a free path of the regulating organ in rotation on its axis during which the impulse pallets describe a trace between the teeth of the escapement wheel parallel to the plane P1 of the latter. It is thus possible, by playing on the orientation of the plane of impulse of the impulse pallets, to obtain an angle of lift of the regulating organ which is very small in comparison with known escapements, with a maximum rotational amplitude of up to 300°, thus providing a very good quality factor for the mechanism of the invention, which is moreover self-starting.

According to an embodiment, at least part of the teeth of the escapement wheel form a projection perpendicular to the plane P1 of said escapement wheel. Such a protrusion makes it easy to shift the impulse place of the escapement wheel to the impulse pallets attached to the regulating organ out of the plane P1 of the escapement wheel.

In contrast to the impulse pallets, the at least one locking pallet is preferably arranged on the locking device to cooperate with the teeth of the escapement wheel at least partially in the plane P1 of said escapement wheel. In particular, this ensures good stability and a good draw of the escapement wheel on the locking device during the locking phases without disturbing the regulating organ which then freely alternates in rotation between the teeth of the escapement wheel.

According to an embodiment of the mechanism of the invention, the impulse pallets are arranged so as to be integral in rotation with the regulating organ that their impulse plane describes a trace whose width, measured in a trace of the escapement mechanism, is at most equal to half the pitch separating two teeth of the escapement wheel. This ensures that the regulating organ can move freely between the teeth of the escapement wheel, especially between the projecting parts of the teeth, without risk of shocks between the impulse pallets and the teeth of the escapement wheel.

According to a preferred embodiment, the impulse pallets are arranged in a rotationally fixed manner on the regulating organ in such a way that the angle of lift at the regulating organ is between 10° and 35°, preferably between 15° and 30°.

In an embodiment, the locking device comprises a locking anchor provided with a first and a second locking pallet and integral with a return lever rotatably mounted about an axis between two locking positions passing through the unlocking position, said locking and unlocking positions being determined by at least two retaining stops on either side of a first end of the return lever and a complementary unlocking organ arranged at a second end of said return lever. This embodiment has the advantage of being very easy to adjust, using an anchor locking device which can be controlled in a more conventional way by the return lever interacting directly with limiting pins or stops on the one hand and the unlocking pallet of the regulating organ on the other hand by means of a fork or similar as described below.

Thus, in this embodiment the complementary unlocking organ can be advantageously formed of an almond-shaped ring in which the axis of the regulating organ extends such that the control pallet moves without contact along the inner walls of said ring during normal operation of the escapement mechanism, said ring defining a control cam, a notch for unlocking the control pallet being formed in the inner wall of said ring in a position of alignment with a longitudinal axis of the return lever. The almond-shaped ring thus forms a functional security for the escapement.

Alternatively, the complementary unlocking organ may be formed by a fork comprising two horns separated by a notch and devoid of a guard pin or the like, said horns being symmetrical with respect to a longitudinal axis of the return lever passing through the axis of rotation and the centre of the notch and extending from said notch along an arc of a circle.

Preferably, said impulse pallets are fixed on an impulse plate integral with the regulating organ and extending in a plane P2 parallel to the plane P1 of the escapement wheel.

The teeth of the escapement wheel then comprise an impulse finger projecting from the plane P1 to engage the impulse plane of the impulse pallets out of said plane P1, the radial ends of said impulse and locking teeth describing the circular trajectory C.

Advantageously in this embodiment, the control pallet is a pin attached to the impulse plate.

In another embodiment of the escapement mechanism of the invention, the locking device comprises a return lever carrying at a first end said locking pallet and being rotatably mounted about an axis between the locking position and the unlocking position, determined by at least one retaining stop and at least one control cam arranged so as to be rotationally rigid with said regulating organ. This embodiment has the advantage of requiring only one locking pallet, and provides a simple and compact escapement structure.

In this embodiment, the complementary unlocking organ comprises a unlocking arm integral with the return lever and provided at a free end with a unlocking tooth arranged to cooperate with said control pallet in said unlocking position.

In addition, the control cam comprises a cam surface and a cam notch formed in said cam surface for cooperation with a cam follower formed at a second end of the return lever opposite to said locking pallet, said control cam and said return lever being respectively arranged such that said cam follower falls into said cam notch in said unlocking position and is pushed out of the notch to pivot the return lever and bring the locking pallet into the path of the escapement wheel in the locking position.

In this particular embodiment, the control pallet may be a pallet fixed on a plate which is rotationally fixed to the regulating organ and movable in a plane P3 parallel to and distinct from the plane P1 of the escapement wheel.

Alternatively, the control cam may comprise a ring and a notch formed on an inner rim of said ring, a cam follower pin at the free end of the unlocking lever extending into said ring, so that said cam follower falls into said cam notch under the action of the unlocking pallet in said unlocking position and is pushed out of said notch to pivot the return lever and bring the locking pallet into the path of the escapement wheel in the locking position.

In this alternative, the ring may be formed by a peripheral groove on the cam and the control pallet may be a pin fixed on the control cam in a position radially aligned with said cam notch with respect to the axis of rotation of the regulating organ.

In this embodiment, the impulse pallets are each fixed on an impulse plate integral with the regulating organ and extending respectively in a first plane P2' and a second plane P2", the planes P2', P2" being symmetrical with respect to the plane P1 of the escapement wheel.

In order to cooperate with said impulse pallets and the locking pallet of the locking device, the escapement wheel then comprises a regular alternation of teeth comprising an impulse bar projecting symmetrically with respect to the plane P1 of said escapement wheel to engage the impulse pallets out of said plane P1 and teeth devoid of projections with respect to the plane P1, the radial ends of said teeth describing the circular trajectory C.

BRIEF DESCRIPTION OF THE DRAWINGS

Other details of the invention will become clearer on reading the following description, with reference to the attached drawings in which.

MODES OF CARRYING OUT THE INVENTION

Figure 1:
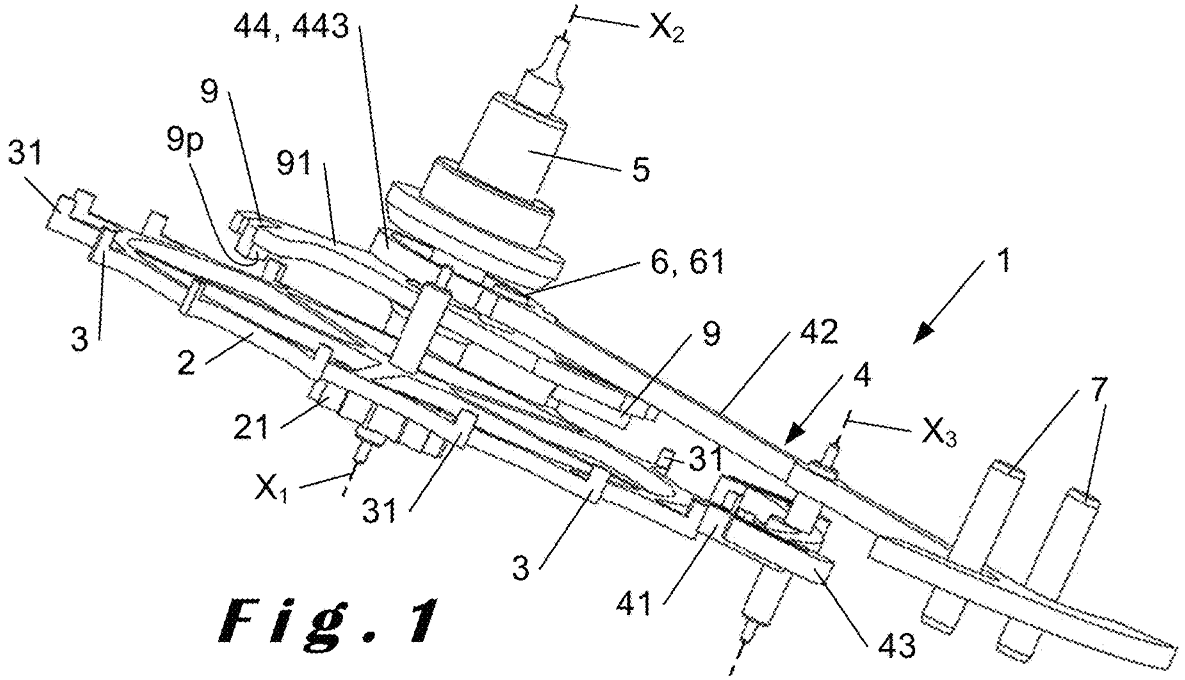
FIG. 1 shows in perspective an escapement mechanism according to the invention in a first embodiment and an associated regulating organ such as a balance represented schematically.

The present invention proposes a free escapement mechanism 1 of a new kind, designed and arranged to exploit and combine, in a free escapement with direct impulses, the advantages of reliability, simplicity of adjustment and self-starting of a Swiss anchor escapement well known to watchmakers for decades by singularly improving its performance by significantly reducing the angle of lift at the regulating organ while allowing a large amplitude in rotation of the latter, thus offering a quality factor far superior to known escapements. In addition, direct pulse operation promotes high energy efficiency.

It advantageously presents a very simple and compact structure, compatible with the use of regulating organs of the sprung balance type classically used in pocket watches or wristwatches, offering the unprecedented possibility of working at the level of the regulating organ with low amplitudes and high frequencies or conversely with large amplitudes of oscillations and lower frequencies, in all cases with increased performance, whether in terms of isochronism or chronometry, compared to the majority of existing anchor mechanisms.

These combined advantages are obtained according to the invention and as shown in FIGS. 1 to 13 by a direct impulse free escapement mechanism 1, comprising an escapement wheel 2 having a series of peripheral teeth 3, a locking device 4 arranged to cooperate in abutment with a tooth 3 of the escapement wheel 2 in a locking position and in this position to undergo a draw, and impulse members 9 capable of being attached to a regulating organ 5 such as a sprung balance so that the latter periodically receives an impulse from a tooth 3 of the escapement wheel 2 in order to maintain its oscillations, said teeth 3 and the impulse members 9 being configured and arranged so that the impulses occur outside the plane P1 of the escapement wheel 2.

This is made possible according to the invention by an original conformation of the teeth 3 of the escapement wheel 2, of which at least a part forms a projection perpendicular to the plane P1 of said escapement wheel, as well as an adjusted configuration and orientation of the impulse organs 9, in such a way that the respective pulse planes of said teeth 3 and of said impulse members 9 interact directly outside the plane P1 of said escapement wheel 2 at each alternation of the regulating organ closest to the dead centre of the mechanism, therefore with a low angle of lift and a minimum of disturbance of the regulating organ at the impulse. The locking draw ensures free movement of the regulating organ during the locking phases over its entire amplitude of movement between the projecting parts of the teeth of the escapement wheel 2.

In practice, the teeth 3 of the escapement wheel form at their free end a protrusion, which has a length measured perpendicular to the plane P1 of the escapement wheel 2, greater than the thickness of the felloe 22 of the escapement wheel 2. This protrusion defines a substantially triangular shape which is represented schematically in the figures by a shoulder line at the end of each tooth 3. In addition, the impulse members 9, for example consisting of ruby pallets, of the escapement mechanism 1 of the invention are advantageously arranged integral in rotation with the regulating organ 5 such that their impulse plane describes a trace whose width, measured in a path of the escapement mechanism, is at most equal to half the pitch separating two teeth 3 of the escapement wheel 2. This allows escapement 1 to be configured such that the angle of lift at the regulating organ 5 is between 10° and 35°, preferably between 15° and 30°, in other words lower than any other escapement mechanism known to date.

The locking device 4 is configured to disturb as little as possible the operation of the regulating organ 5 and thus to cooperate with the teeth 3 of the escapement wheel at least partially, and preferably completely, in the plane P1 of said escapement wheel 2. Combined with the particular configuration of the projections of the teeth 3, this gives the escapement wheel 2 the ability to cooperate alternately with the locking device 4 and the impulse members 9 in superimposed and secant parallel planes of said teeth 31. The impulse and locking phases of the escapement mechanism of the invention thus intervene not only separately from one another but in different planes, or levels, of the mechanism, which allows a very compact construction and a minimum of disturbances, while offering a wide choice of frequency and amplitude of operation of the regulating organ due to the possible entanglement of the circumcircles of the escapement wheel 2 and its teeth 3 and of the impulse organs 9.

The escapement mechanism 1 of the invention is presented more particularly in the figures under two particular embodiments, shown respectively in FIGS. 1 to 7 and FIGS. 8 to 13.

With reference first of all to the first embodiment, concerning the escapement mechanism 1 of the invention. It comprises an escapement wheel 2 extending in a plane P1 and provided with peripheral teeth 3 and rotatably mounted about an axis of rotation X1 perpendicular to this plane P1. Said teeth 3 define by their free ends a circular trajectory C during the rotation of the escapement wheel 2. In a conventional way, this escapement wheel 2 is associated with an escapement pinion 21 driven on a pivot of axis X1 common to the escapement wheel 2 and by which the latter can be coupled in use to the finishing gear train and the driving source of a watch movement in which the escapement mechanism 1 is integrated to maintain the oscillations of a regulating organ 5 of the movement, rotatably mounted around an axis of rotation X2.

In accordance with the invention, the teeth 3 of the escapement wheel 2 each have a protruding portion on the surface of the escapement wheel 2 to allow transmission of impulses to the regulating organ 5 out of the plane P1 of the escapement wheel 2. These projections are formed in this embodiment by an impulse finger 31 projecting with respect to the plane P1 in order to engage, at each step of rotation of the escapement wheel 2, the impulse plane 9*p* of a first or second impulse pallet 9 fixed to an impulse plate 91 integral with the regulating organ 5 and extending in a plane P2 parallel to the plane P1 of the escapement wheel 2. Advantageously, said impulse pallets 9 are fixed to the plate 91 by any suitable means and they also extend, as can be seen from FIGS. 1, 3 and 5 in particular, projecting perpendicularly to the plane P2 of the plate 91 in the direction of the escapement wheel 2. The impulse fingers 31 of the teeth 3 of the escapement wheel 2 and impulse pallets 9 integral with the regulating organ 5 are thus arranged "head to tail" to ensure their interaction outside said plane P1, and more particularly here between the planes P1 and P2 of the escapement wheel and impulse plate 91, respectively.

As shown, the impulse surfaces 9*p* of the impulse pallets 9, on which the fingers 31 of the teeth 3 of the escapement wheel 2 slide and act, have a flat surface. They can also advantageously have a curved, concave or convex shape, in order to provide a progressive acceleration of the impulse or to symmetrize the impulse on each of the impulse pallets 9 with respect to the X2 axis of the regulating organ 5. Thus, one can play directly on the path of the escapement, by acting on the movements of the impulse pallets 9 in relation to the escapement wheel 2, at the level of their angular values, their speeds and the transmitted torques.

Escapement mechanism 1 also has a locking device 4, which is itself rotatable about an axis of rotation X3. The axes of rotation X1, X2, X3 of the escapement wheel 2, the regulating organ 5 and the locking device 4 are preferably parallel to each other. The regulating organ 5, which is not part of the escapement mechanism 1 as such, may consist of a sprung balance well known to the watchmaker or any other oscillating regulating organ, such as for example a knife resonator as proposed by the applicant in patent application WO 2016/012281 A1.

Figure 5:
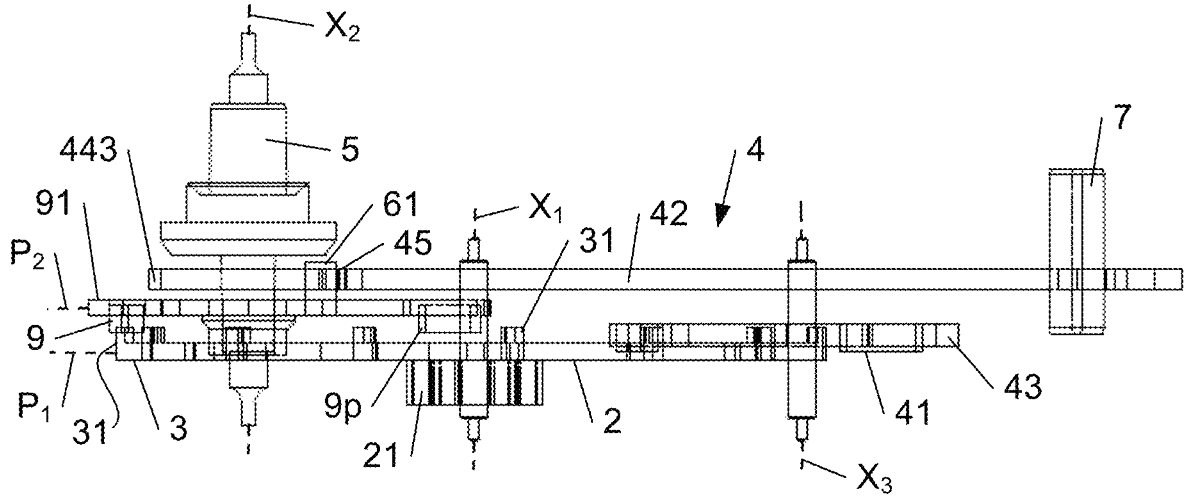
FIG. 5 represents a front view of the escapement mechanism of the invention at the end of an impulse phase as shown in FIG. 4.
Figure 6:
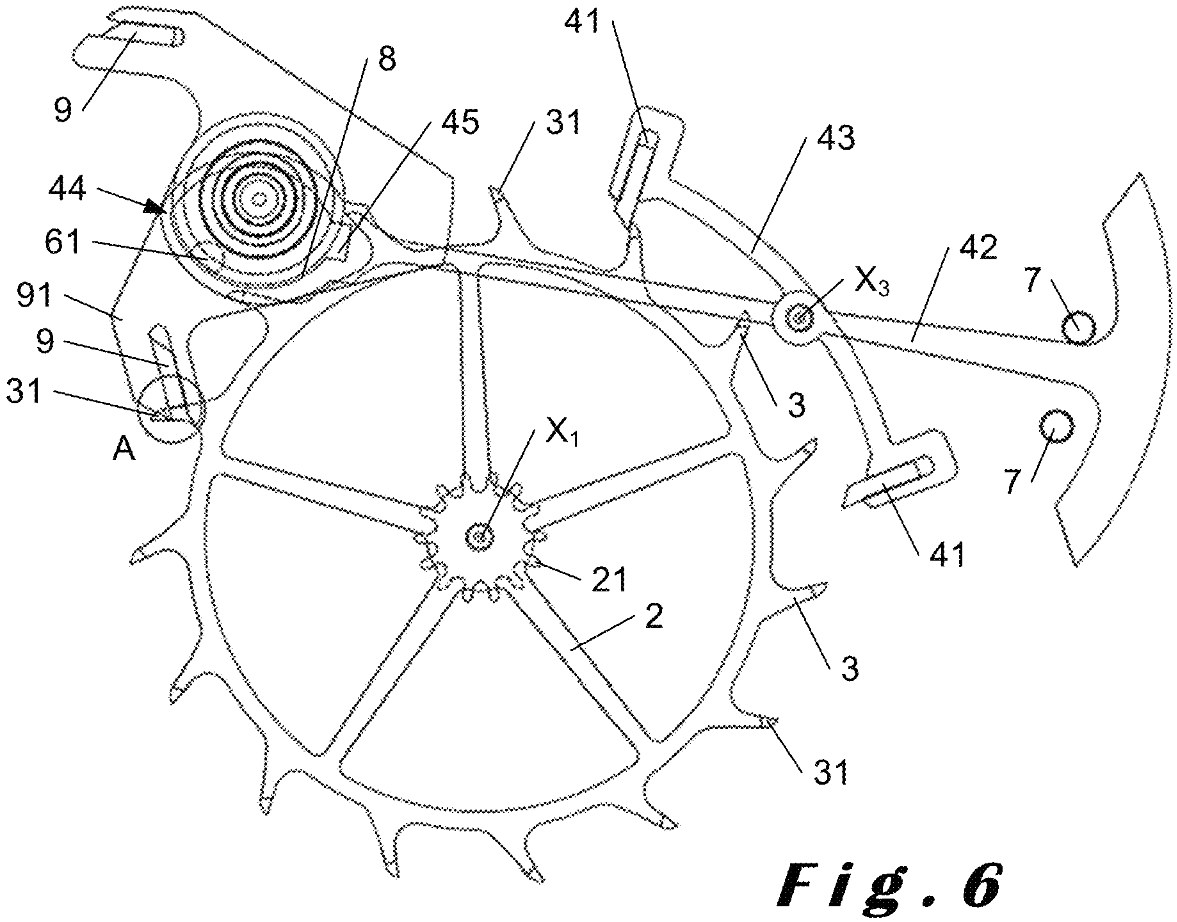
FIG. 6 shows the escapement mechanism of FIG. 1 in top view, in the locking position during the free alternation of the regulating organ.
Figure 7:
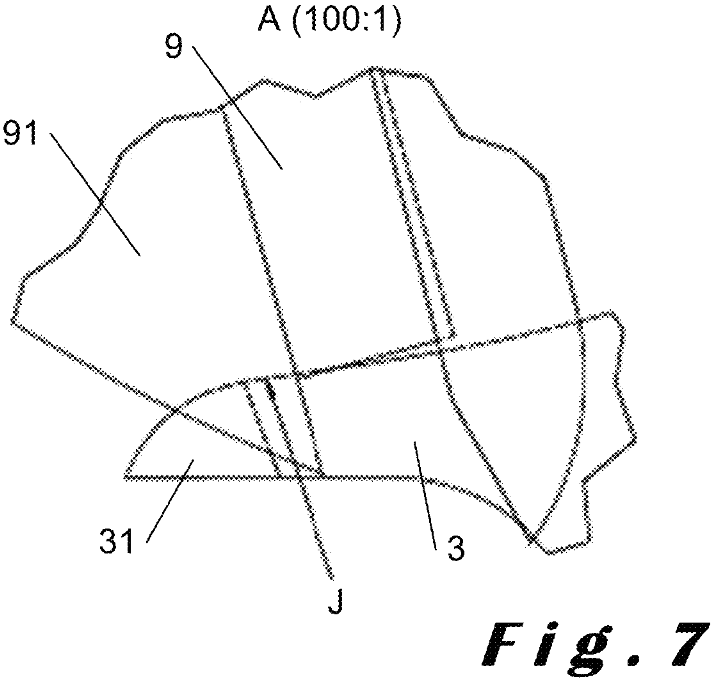
FIG. 7 is an enlargement of FIG. 6 showing a play between the back of an impulse pallet and an impulse plane of a tooth of the escapement wheel of the mechanism.

The locking device 4 comprises a bar-shaped return lever 42 which is rotatably mounted on a pivot about the axis X3 and to which an anchor 43, which is made of the same material as the return lever 42 and is riveted or driven onto the pivot of rotation of the latter, is attached, at the ends of the arms of which are arranged two locking pallets 41 each having a locking plane 41*r* for alternately forming an abutting locking surface for the teeth 3 of the escapement wheel 2 in two extreme positions of rotation of the return lever 42 about its axis X3, called locking positions, one position of which is shown in FIGS. 5 and 6.

The pivoting of the return lever 42 in rotation about the axis X3 to move the locking anchor 43 between the two locking positions is controlled as in a conventional anchor escapement by the regulating organ 5 acting on one end of the return lever 42. This interaction takes place on each alternation in a so-called unlocking position by means of a unlocking pallet 6, for example formed by a pin 61, fixed to the impulse plate 91 on a complementary unlocking organ 44 formed at said first end 42 of the return lever 42. This interaction induces the pivoting of the return lever 42 around the axis X3 and thus the unlocking of the locking anchor 43, more precisely of one of the locking pallets 41, of one tooth 3 of the escapement wheel 2 prior to an impulse given by another tooth 3 of the escapement wheel on one of the impulse elements 9 of the regulating organ 5. In addition, the angular travel of the return lever 42 is also limited by limiting stops 7, e.g. formed by pins, arranged on both sides of the second end of the return lever 42. These stops 7 determine the locking positions of the locking anchor 43 such that each locking pallet 41 is located in the trajectory C defined by the teeth 3 of the escapement wheel when the return lever 42 comes into contact with one of the stops 7. The return lever 42 and the locking anchor 43 are then held in place during the free course of the regulating organ 5 after impulse by the draw effect of the escapement wheel 2 on the locking anchor 43 and the return lever 42.

Figure 2:
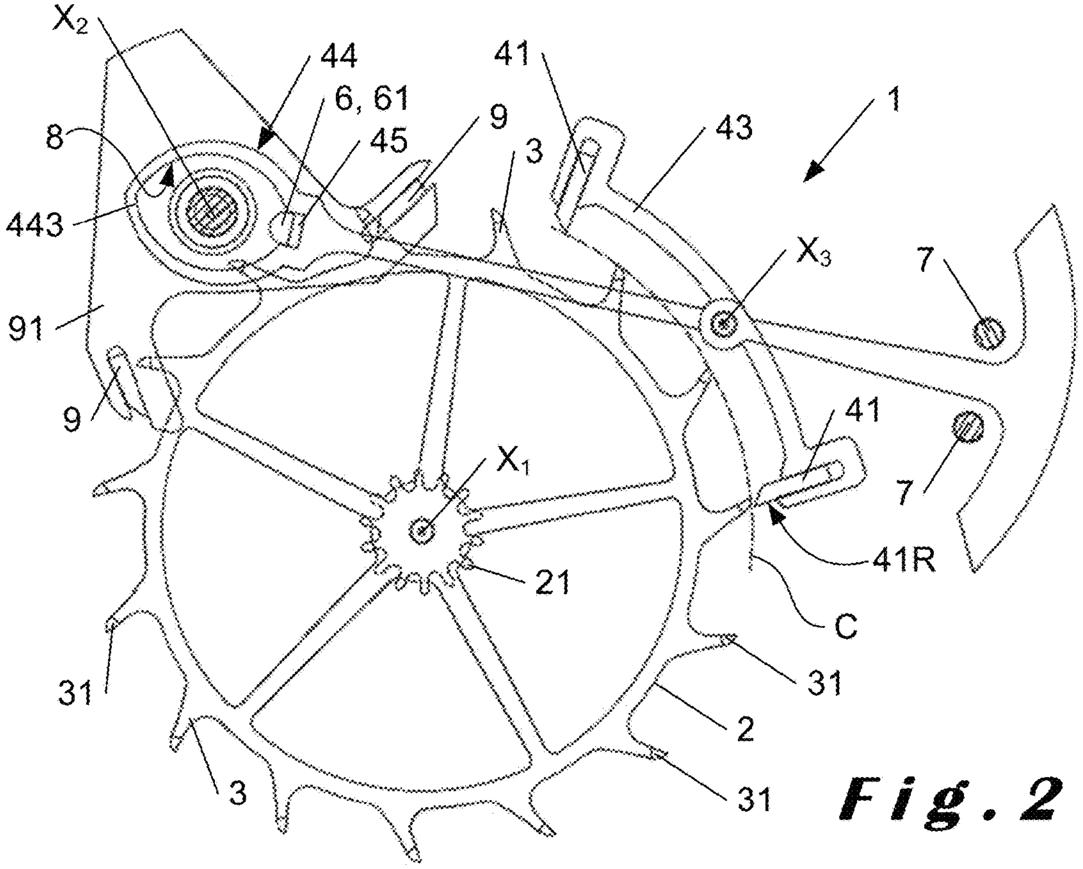
FIG. 2 shows the escapement mechanism of FIG. 1 in top view, at the dead centre of the escapement.
Figure 3:
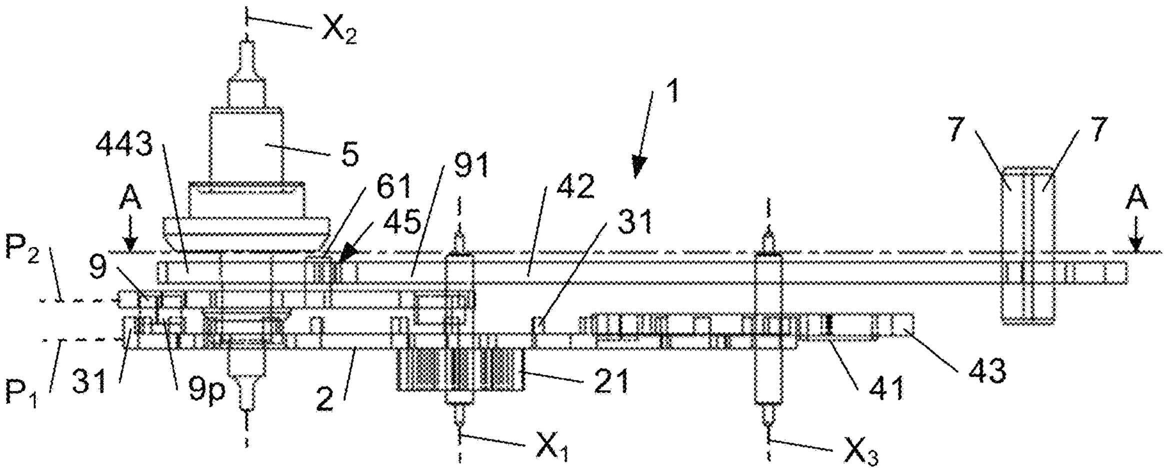
FIG. 3 shows a front view of the escapement mechanism from FIG. 1 at the escapement dead centre.
Figure 4:
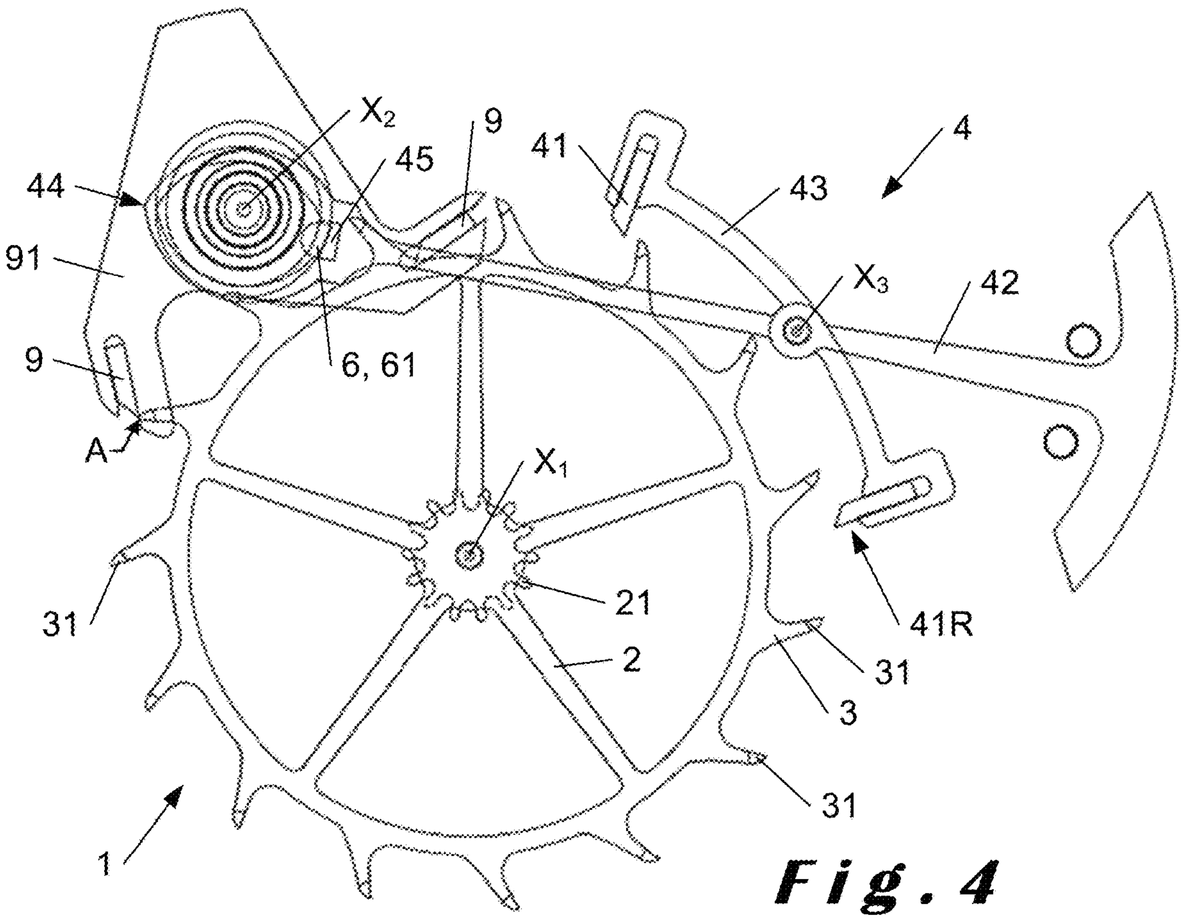
FIG. 4 shows the escapement mechanism of FIG. 1 in top view, at the end of an impulse phase.

As can be seen from FIGS. 2 and 3, the return lever 42 and the locking anchor 43 are arranged in relation to the regulating organ 5 and the escapement wheel 2 in such a way that, in the dead centre of the escapement shown in FIG. 1, the locking pallets 41 are located at a distance from the axis of rotation X1 of the escapement wheel 2 greater than the radius of the circumcircle C of the teeth 3 of the escapement wheel 2, when at the same time the ends of the impulse pallets 9 intersect said circumcircle C, and are thus located at a distance from the axis of rotation of the escapement wheel 2 smaller than the radius R.

By this configuration, at the dead centre of the escapement 1, the pulse planes 9*p* of the impulse pallets 9 are located in the path of the fingers 31 of the teeth 3 of the escapement wheel, while the locking pallets 41 are located outside this path. Also, the rotation of the escapement wheel 2 necessarily involves the engagement by a finger 31 of an impulse plane 9*p* of an impulse pallet 9 and the driving of the regulating organ 5 in rotation around its axis. This ensures a self-starting character to the escapement mechanism 1 of the invention.

Another advantageous feature is that the impulse fingers 31 and impulse pallets 9 are also shaped so that in each locking position the impulse pallets 9 can fully circulate between the fingers 31 of the teeth 3 of the escapement wheel 2, thus ensuring a maximum amplitude of angular deflection at the regulating organ 5, which in this case can be up to 300°. For this purpose, as shown in particular in FIGS. 6 and 7, the rear flank of the fingers 31 is chamfered, thus giving a triangular shape to the fingers 31, so as to free a play J at the rear end of each impulse pallet 9 when the regulating organ 5 passes freely in the locking position of the escapement wheel 2.

In the example shown in FIGS. 1 to 7, the complementary unlocking organ 44 is advantageously formed by an almond-shaped ring 443 in which the axis X2 of regulating organ 5 extends. This ring 443 is configured so that during normal operation of the escapement mechanism 1 the control pallet 6 integral with the regulating organ 5 circulates without contact along the internal walls 444 of said ring, which thus define a control cam 8 for the unlocking of the return lever 42. A unlocking notch 45 is formed in the inner wall of said ring 443 in a position of alignment with a longitudinal axis of the return lever passing through the axis of rotation X3 thereof. This unlocking notch allows, in a conventional manner, the control pin 61 to fall at each alternation of the regulating organ so as to cause the return lever 42 to pivot and the locking anchor to be unlocked. Such a ring 443 has the advantage by a very simple configuration to provide not only the unlocking but also the safety of the escapement, the internal walls of the ring preventing in case of impact any untimely unlocking out of impulse.

However, the complementary unlocking organ 44 could be in a different form than that shown in FIGS. 1 to 7. It may in particular be formed by a fork comprising two horns separated by a notch and devoid of a guard pin or the like, said horns being symmetrical with respect to the longitudinal axis of the return lever 42 passing through the axis of rotation X3 and the centre of the notch and extending from said notch along an arc of a circle.

FIGS. 8 to 13 show a second embodiment of the escapement mechanism according to the invention. This embodiment differs from the previous one in that it simplifies the locking device 4, which has only one locking pallet 4 whose movement is controlled by a trigger-type unlocking device. In addition, only one out of two teeth 3 of the escapement wheel 2 actually participates in the impulses by acting alternately on two parallel levels of impulses on either side of the plane P1 of the escapement wheel 2, as described below.

Figure 8:
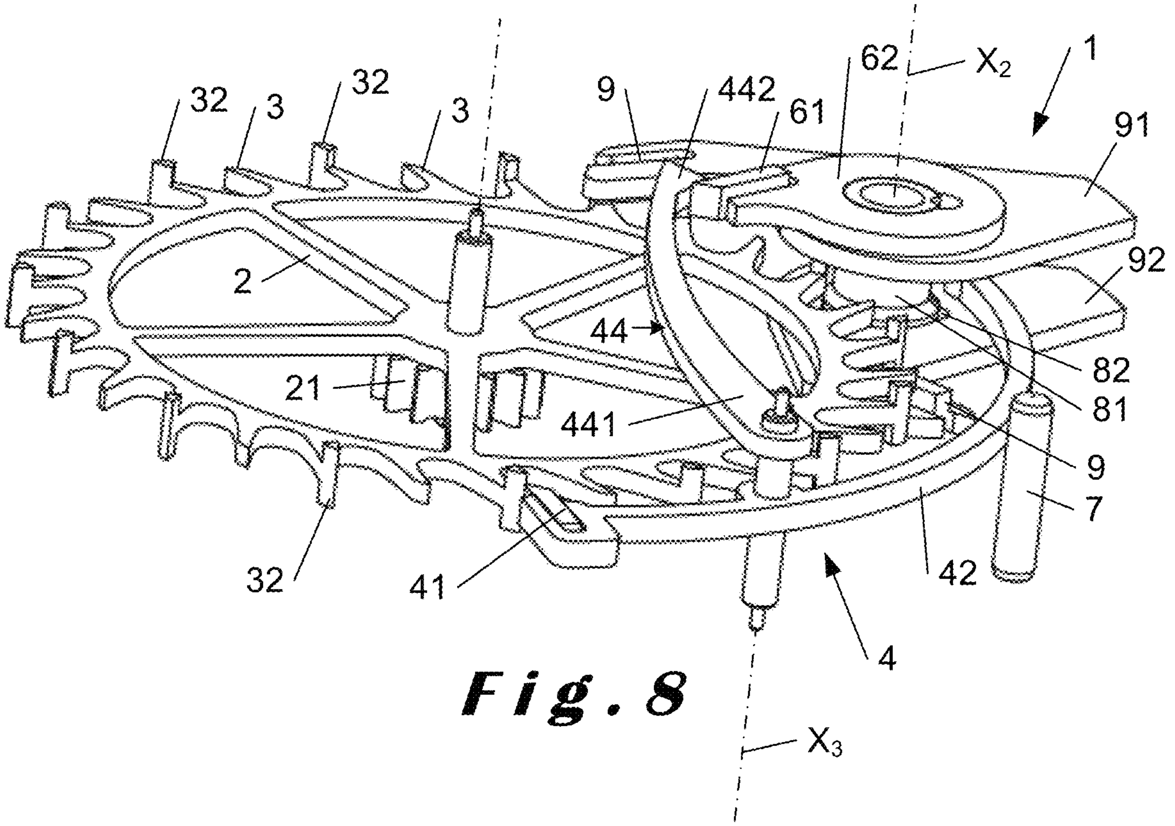
FIG. 8 shows in perspective an escapement mechanism according to the invention in a second embodiment, comprising a locking device with a single locking pallet and an unlocking arm.
Figure 10:
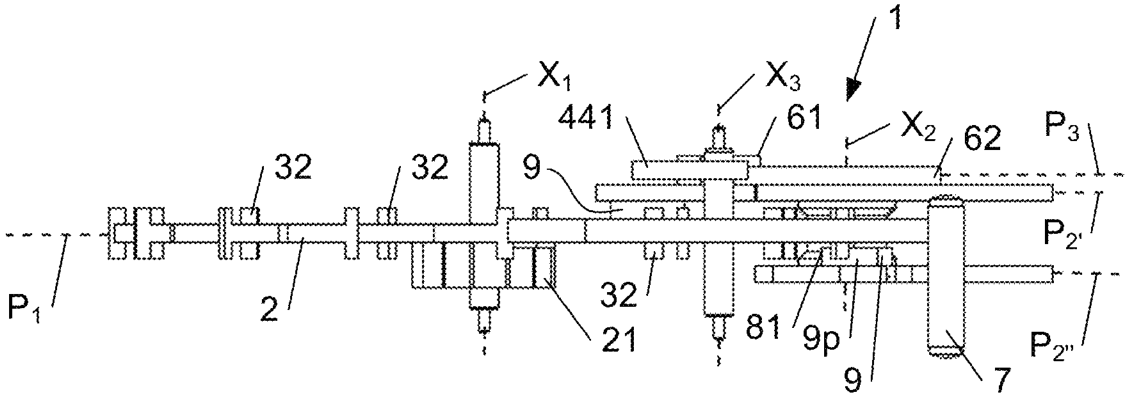
FIG. 10 is a top view of the escapement mechanism of FIG. 9.

With reference to FIGS. 8 and 10 in particular, the escapement mechanism 1 of this second embodiment comprises an escapement wheel 2 extending in a plane P1 rotatably mounted about an axis of rotation X1 perpendicular to this plane P1. The escapement wheel 2 is provided with peripheral teeth 3 defining by their free ends a circular path C during the rotation of the escapement wheel 2. The number of teeth 3 of the escapement wheel 2 in this second embodiment is equal to twice that of the escapement wheel of the escapement mechanism according to the first embodiment, in order to compensate in particular for the removal of the second locking pallet 41 at the locking device 4, as will be described below. In a conventional way, the escapement wheel 2 is associated with an escapement pinion 21 driven on a pivot of axis X1 common to the escapement wheel 2 and by which the latter can be coupled in use to the finishing gear train and the driving source of a watch movement in which the escapement mechanism 1 is integrated to maintain the oscillations of a regulating organ 5 of the movement, rotatably mounted around an axis of rotation X2.

In an original way, the teeth 3 of the escapement wheel 2 comprise a regular alternation of teeth 3 comprising an impulse bar 32, forming two symmetrical projections on either side of the plane P1 of the escapement wheel 2, and teeth 3 without projections and contained substantially in the plane P1, as in an ordinary escapement wheel 2. The impulse bars 32, shaped in practice like two fingers 31 of the first embodiment symmetrical with respect to the plane P1, are arranged to engage an impulse plane 9*p* of a first and a second impulse pallet 9 fixed respectively to an upper impulse plate 91 and a lower impulse plate 92 integral with the regulating organ 5 and extending respectively in two planes P2', P2" parallel and symmetrical with respect to the plane P1 of the escapement wheel 2.

Figure 12:
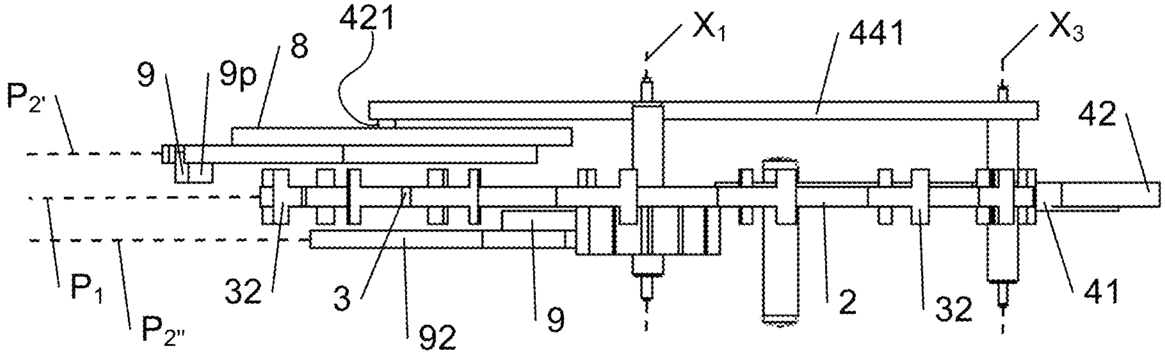

The impulse pallets 9 also extend, as can be seen in FIGS. 8, 10 and 12 in particular, projecting perpendicular to the P2', P2" planes of plates 91, 92 in the direction of the escapement wheel 2. Each impulse pallet 9 is thus arranged "head to tail" with one of the projecting portions of the impulse bars 32 formed one tooth in 2 of the escapement wheel so as to provide impulses alternately between plane P1 and plane P2' on the one hand and between plane P1 and plane P2" on the other hand on each alternation of the regulating organ 5.

As shown, the impulse surfaces 9*p* of the impulse pallets 9, on which the fingers 32 of the teeth 3 of the escapement wheel 2 slide and act, have a flat surface. They can also advantageously have a curved, concave or convex shape, in order to provide a progressive acceleration of the impulse or to symmetrize the impulse on each of the impulse pallets 9 with respect to the X2 axis of the regulating organ 5. Thus, one can play directly on the path of the escapement, by acting on the movements of the impulse pallets 9 in relation to the escapement wheel 2, at the level of their angular values, their speeds and the transmitted torques.

The escapement mechanism 1 also has a locking device 4, rotatably mounted about an axis of rotation X3. This locking device 4 is, as previously presented, extremely simplified and comprises only a single locking pallet 41 arranged at one end of an arcuate return lever 42 rotatable about a pivot of axis X3 between a locking position, shown in FIGS. 8, 9 and 11 and an unlocking position, shown in FIG. 13. These two positions are determined by a retaining stop 7, formed by a single pin, and a control cam 8 arranged as an integral part of the rotation of said regulating organ 5.

The pivoting of the return lever 42 in rotation about the axis X3 between the locking position and the unlocking position is controlled by the regulating organ 5 via an unlocking pallet 6 acting on a complementary unlocking organ 44 integral with the lever 42 on the one hand and the control cam 8 acting directly on the return lever 42 on the other hand.

Figure 9:
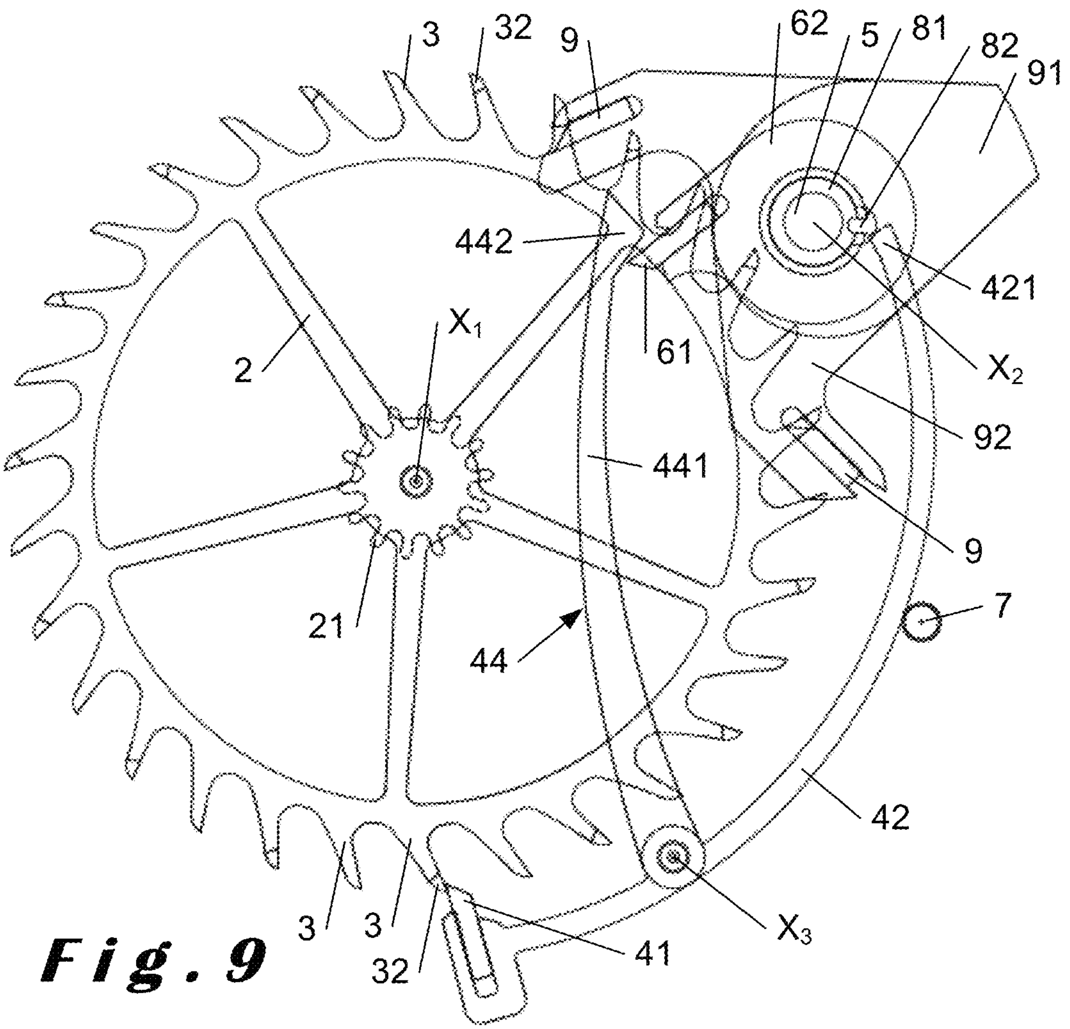
FIG. 9 is a top view of the escapement mechanism of FIG. 8.

In the embodiment shown in FIGS. 8 to 10, the control pallet 6 is a pallet 61 attached to a plate 62 which is fixed to the regulating organ 5 and arranged on the upper impulse plate 91. The unlocking pallet 61 and its plate 62 are thus mobile in a plane P3 parallel and distinct from the plane P1 of the escapement wheel 2 and the planes P2', P2" of the impulse plates 91, 92. The control pallet 6 is arranged to trigger the unlocking of the locking device 4 from its locking position, i.e. more specifically to release the locking pallet 41 from its engagement against a tooth 3 of the escapement wheel in order to allow the transmission by the latter of an impulse on one of the impulse pallets 9 at each alternation of the regulating organ 5. For this purpose, the unlocking pallet 6 cooperates with a complementary unlocking organ 44 which is formed by a unlocking arm 441 which is integral in rotation with the return lever 42 and which in this example is driven on the pivot point of the return lever 42. The unlocking arm 441 has a unlocking tooth 442 at one free end, on the sides of which the unlocking pallet 61 is supported in the unlocking position prior to the impulse and pushes the unlocking arm 441 to swivel the return lever 42 about its release axis X3 counter-clockwise (according to the convention of the figures).

This rotation of lever 42 to unlock the locking pallet 41 from the escapement wheel is, however, secured by control cam 8 which controls the rotation of the return lever 42 at a free end 421 of the latter opposite the locking pallet 41 and forming a cam follower. For this purpose, the control cam 8 is formed by a shaft of axis X2 integral with and/or forming part of the axis or pivot of the regulating organ 5, said shaft being embedded between the upper 91 and lower 92 impulse plates. The cylindrical peripheral surface 81 of this shaft forms a cam surface in which a unlocking notch 82 is formed. The return lever 42 is so arranged in relation to the escapement wheel 2 and the regulating organ 5 that, in the locking position, it rests against the stop 7 and its end 421 is positioned opposite, but not touching, the cam surface 8, the locking pallet 41 resting on its locking plane 41*r* against a tooth 3 of the escapement wheel. Thus, in the event of impacts, said end 421 comes into contact with said cam surface 81, preventing rotation of the return lever 42 and thus any unlocking of the locking pallet 41. Such an unlocking is only permitted in the unlocking position, in which the cam follower 421 falls into the cam groove 82 simultaneously with the pushing of the unlocking pallet 61 onto tooth 442 of the unlocking arm 441. This drop of the cam follower 421 into the notch releases the rotating lever 42 which rotates under the thrust undergone by the arm 441, releasing the locking pallet 4. The escapement wheel 2 rotates and gives an impulse to the regulating organ 5 via an impulse strip 32 on an impulse pallet 9. During the rotation of the regulating organ 5 under the impulse of the escapement wheel 2 the cam follower 421 is pushed back by the cam surface 81 while the regulating organ begins its free alternation, which causes the return lever 42 to rotate clockwise, bringing the locking pallet 41 back into the path C of the escapement wheel, thus providing the stop necessary for the locking phase, and under the effect of the draw force forcing the return lever 42 against the retaining stop 7.

The unlocking and locking phases are thus easily controlled and secured by the control cam 8, without any risk of unintentional release in the event of shocks and out of pulses, even at high oscillation frequencies of the regulating organ 5.

Figure 11:
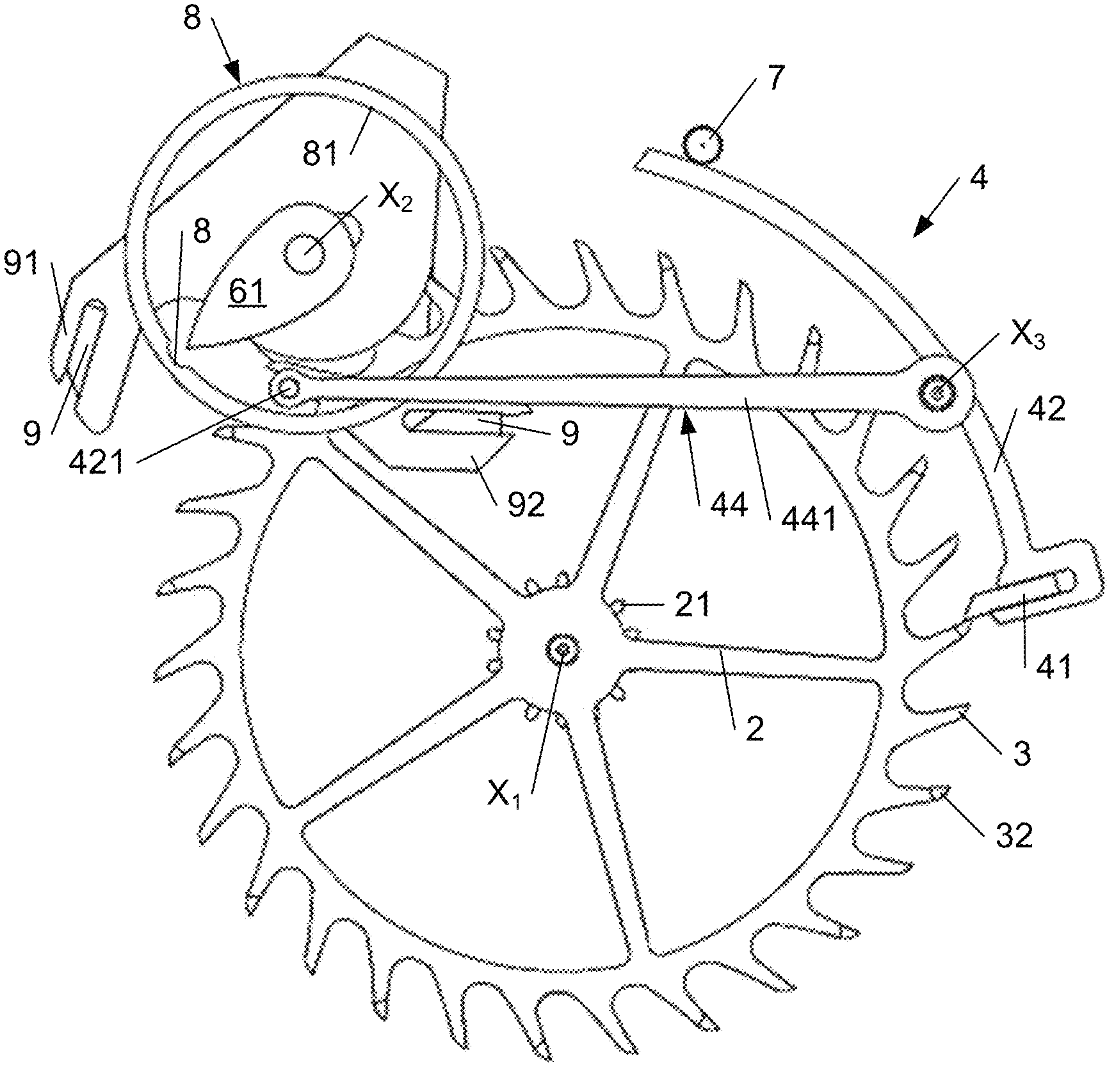
FIGS. 11 to 13 show a variant of the escapement mechanism of FIGS. 8 to 10 in which the locking device has an annular control cam and a cam follower attached to a unlocking arm.
Figure 13:
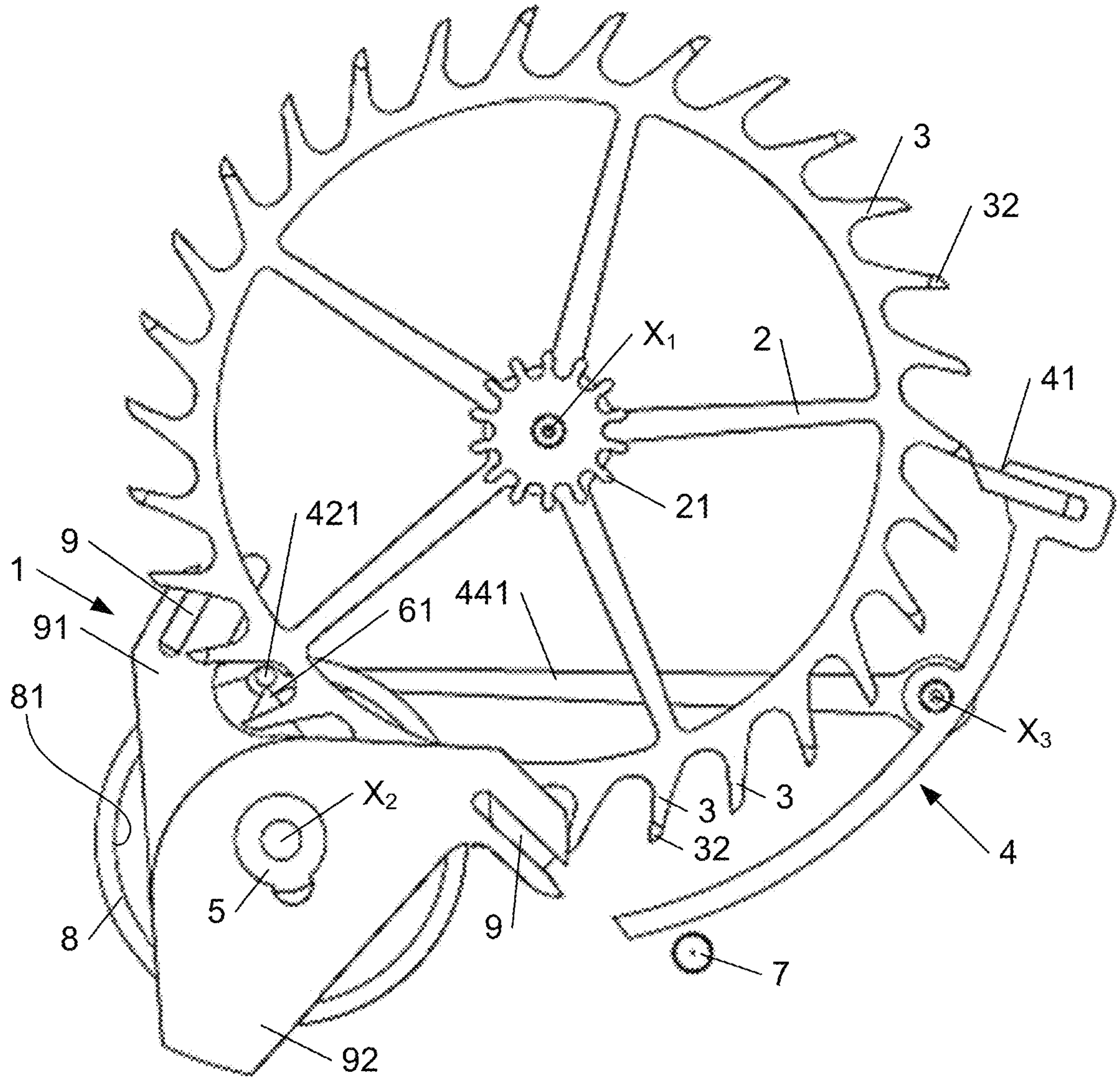

FIGS. 11 to 13 show escapement mechanism 1 in its second embodiment with an alternative unlocking and safety mechanism. In this embodiment, the control cam 8 is formed by a ring with a circular inner wall or rim forming a cam surface 81 in which a cam notch 82 is recessed. In the example shown, the ring 8 can be formed from a circle concentric to the axis X2 and attached to the regulating organ 5 by gluing or other means of attachment to the upper impulse plate 91. The ring 8 can also be made of material in one piece with the impulse plate 91. The unlocking pallet 6 is then formed by a finger or feeler 61 which is fixed to the regulating organ 5 and whose free end is aligned and partially penetrates into notch 82 of the ring.

The cam follower 421 consists of a pin or the like driven into the free end of the unlocking lever 441 and extending into said ring 8.

Thus, as shown in FIG. 13 and in accordance with the operating principles previously defined with reference to FIGS. 8 to 10, the cam follower 421 falls into said cam notch 82 under the action of the unlocking pallet 61 in said unlocking position and is pushed out of the notch 82 opposite the inner cam surface 81 of the ring in the locking position.

In another embodiment not shown, the cam ring 8 could also be formed by a circular groove on the upper impulse plate 91 in which the cam follower pin 421 would be housed, said groove having a said cam notch and the unlocking pallet 6 then being formed by a pin radially aligned with the cam notch with respect to the axis of rotation X2 of the regulating organ 5.

Finally, as in the embodiment of FIGS. 1 to 7, the escapement mechanism 1 in the second embodiment of FIGS. 8 to 13 is also self-starting. As can be seen from FIG. 13 in particular, the return lever 42 is arranged in relation to the regulating organ 5 and the escapement wheel 2 in such a way that, in the unlocking position, therefore just before the dead centre of the escapement, the locking pallet 41 goes away from the circumcircle C of the teeth 3 of the escapement wheel 2, when at the same time the ends of the impulse pallets 9 intersect said circumcircle C, and are thus located at a distance from the axis of rotation of the escapement wheel 2 smaller than the radius R.

By this configuration, at the dead centre of the escapement 1, the impulse planes 9*p* of the impulse pallets 9 are located in the path C of the teeth 3 of the escapement wheel, while the locking pallet 41 is located outside of this path. Also, the rotation of the escapement wheel 2 necessarily involves the engagement by a bar 32 of an impulse plane 9*p* of an impulse pallet 9 and the driving of the regulating organ 5 in rotation around its axis and the driving of the escapement mechanism 1 according to the invention.

The invention claimed is:

1. A direct impulse free escapement mechanism for a timepiece, comprising:

an escapement wheel, extending in a plane P1 and rotatable about a first axis of rotation perpendicular to this plane P1 and provided with a series of peripheral teeth, said teeth defining by their ends during rotation of the escapement wheel a circular trajectory C, a locking device comprising at least one locking pallet arranged to cooperate in abutment with one of said teeth of the escapement wheel in at least one locking position of said locking device, at least one control pallet capable of being attached to a regulating organ pivoting about a second axis of rotation in order to cooperate with at least one complementary unlocking organ of the locking device in order to release the locking device from the escapement wheel in an unlocking position at each alternation of said regulating organ, impulse pallets capable of being attached to said regulating organ to cooperate each on an impulse plane of one of the impulse pallets with the one of said teeth of the escapement wheel to transmit a direct impulse to said regulating organ;

wherein the locking device is arranged to undergo a draw by the escapement wheel in each locking position and that the teeth of the escapement wheel and the impulse pallets are configured and arranged such that the impulses occur outside the plane P1 of the escapement wheel.

2. The escapement mechanism according to claim 1, wherein at least one part of the teeth of the escapement wheel forms a projection perpendicular to the plane P1 of said escapement wheel.

3. The escapement mechanism according to claim 1, wherein the at least one locking pallet is arranged on the locking device to cooperate with the teeth of the escapement wheel at least partially in the plane P1 of said escapement wheel.

4. The escapement mechanism according to claim 1, wherein each impulse pallet is arranged so as to be integral in rotation with the regulating organ such that the impulse plane describes a trace whose width, measured in a trace of the escapement mechanism, is at most equal to half the pitch separating two teeth of the escapement wheel.

5. The escapement mechanism according to claim 1, wherein each impulse pallet is arranged integral in rotation with the regulating organ such that the angle of lift at the regulating organ is between 10° and 35°.

6. The escapement mechanism according to claim 1, wherein the locking device comprises a locking anchor provided with a first and a second locking pallet and integral with a return lever rotatably mounted about a third axis between two locking positions passing through the unlocking position, said locking and unlocking positions being determined by at least two retaining stops on either side of a first end of the return lever and the at least one complementary unlocking organ arranged at a second end of said return lever.

7. The escapement mechanism according to claim 6, wherein the at least one complementary unlocking organ is formed of an almond-shaped ring in which the second axis of the regulating organ extends so that the control pallet moves without contact along the inner walls of said ring defining a control cam, an unlocking notch of the control pallet being formed in the inner wall of said ring in a position aligned with a longitudinal axis of the return lever.

8. The escapement mechanism according to claim 6, wherein the at least one complementary unlocking organ is formed by a fork comprising two horns separated by a notch and devoid of a guard pin, said horns being symmetrical with respect to a longitudinal axis of the return lever passing through the third axis of rotation and the centre of the notch and extending from said notch along an arc of a circle.

9. The escapement mechanism according to claim 6, wherein said impulse pallets comprise first and second impulse pallets fixed to an impulse plate integral with the regulating organ and extending in a plane P2 parallel to the plane P1 of the escapement wheel.

10. The escapement mechanism according to claim 6, wherein the teeth of the escapement wheel comprise an impulse finger projecting from the plane P1 of the escapement wheel to engage the impulse plane of the impulse pallets out of said plane P1 of the escapement wheel, the radial ends of said impulse and locking teeth describing the circular trajectory C.

11. The escapement mechanism according to claim 6, wherein the control pallet is a pin integral with the impulse plate.

12. The escapement mechanism according to claim 1, wherein said locking device comprises a return lever carrying at a first end said locking pallet and being rotatably mounted about a third axis between the locking position and the release position, determined by at least one retaining stop and at least one control cam arranged so as to be rotationally rigid with said regulating organ.

13. The escapement mechanism according to claim 12, wherein the at least one complementary unlocking organ comprises an unlocking arm integral with the return lever and provided at a free end of an unlocking tooth arranged to cooperate with said control pallet in said unlocking position.

14. The escapement mechanism according to claim 12, wherein the control cam comprises a cam surface and a cam notch formed in said cam surface for cooperation with a cam follower formed at a second end of the return lever opposite to said locking pallet, said control cam and said return lever being respectively arranged such that said cam follower falls into said cam notch in said unlocking position and is pushed out of the notch to pivot the return lever in the locking position.

15. The escapement mechanism according to claim 12, wherein the control pallet is a pallet fixed on a plate integral in rotation with the regulating organ and movable in a plane P3 parallel to and distinct from the plane P1 of the escapement wheel.

16. The escapement mechanism according to claim 12, wherein the control cam comprises a ring and a cam notch formed on an inner rim of said cam surface ring, a cam follower pin at the free end of the unlocking lever extending into said ring such that said cam follower falls into said cam notch in said unlocking position and is pushed out of said cam notch to pivot the return lever to the locking position.

17. The escapement mechanism according to claim 16, wherein the control pallet is a pin fixed to the control cam in a position radially aligned with said cam notch with respect to the second axis of rotation of the regulating organ.

18. The escapement mechanism according to claim 1, wherein said impulse pallets comprise first and second impulse pallets each fixed to an impulse plate integral with the regulating organ and extending respectively in a first plane P2 and a second plane P2', the planes P2, P2' being symmetrical with respect to the plane P1 of the escapement wheel.

19. The escapement mechanism according to claim 18, wherein the series of peripheral teeth of the escapement wheel comprises an impulse bar projecting symmetrically with respect to the plane P1 of said escapement wheel to engage the impulse pallets out of said plane P1 of the escapement wheel and teeth devoid of projections with respect to the plane P1 of the escapement wheel, the radial ends of said teeth describing the circular trajectory C.

20. A timepiece comprising the escapement mechanism according to claim 1.

* * * * *